May 11, 1954 W. D. HORN ET AL 2,678,382

AUTOMATIC RADIO LISTENER SURVEY SYSTEM

Filed Dec. 16, 1948

3 Sheets-Sheet 1

Inventors
WILLIAM D. HORN
JOHN H. RAGAZZINI
Attorney

May 11, 1954 W. D. HORN ET AL 2,678,382

AUTOMATIC RADIO LISTENER SURVEY SYSTEM

Filed Dec. 16, 1948 3 Sheets-Sheet 2

Inventors
WILLIAM D. HORN
JOHN H. RAGAZZINI

By

Attorney

AUTOMATIC RADIO LISTENER SURVEY SYSTEM

Filed Dec. 16, 1948 3 Sheets-Sheet 3

Inventors
WILLIAM D. HORN
JOHN H. RAGAZZINI
By [signature]
Attorney

Patented May 11, 1954 2,678,382

UNITED STATES PATENT OFFICE 2,678,382

AUTOMATIC RADIO LISTENER SURVEY SYSTEM

William D. Horn and John R. Ragazzini, New York, N. Y.; said Ragazzini assignor to said Horn Application December 16, 1948, Serial No. 65,596

5 Claims. (Cl. 250—2)

This invention relates to an automatic radio listener survey system and more particularly to a system for making an automatic record of the number of home radio receivers in a selected group which are tuned to a given radio broadcast at any given time.

An object of the invention is to provide a system of the above type which records sufficient data to permit the records to be broken down and tabulated in accordance with the different types of information desired, for example, according to areas, according to income groups, according to selected intervals, etc.

Another object is to provide a system of the above type in which the information from scattered communities may be readily assembled and analyzed at a given central point.

Another object is to provide a system of the above type which does not require the aid of special signals from the broadcast station and, consequently, dies not require the cooperation of the broadcast company.

Another object is to provide a system of the above type which operates in response to a selected normal recurring characteristic of the received program.

Various other objects and advantages will be apparent as the nature of the invention is more fully disclosed.

In accordance with the present invention, the control is effected in response to a recurring normal characteristic of the received program which may comprise, for example, a selected audio frequency note or series of notes, or a selected audio volume level. In a specific embodiment the silent periods in the audio frequency are utilized for the controls. Such silent periods may, for example, constitute the intervals between words or syllables of a spoken program or the rests in a musical program. Such periods normally have a duration of only a fraction of a second and recur on an average of more than once per second. The time distribution of such silent periods constitutes a code which is distinctive for each received program.

More specifically, a central recording station is connected to each of the selected home receivers by a conductor, such as a telephone line, or a transmission link, such as a radio beam. The audio signal being received by the home receiver is imposed on this line by suitable means, such as a microphone placed in the radio receiver, or by a suitable connection to the audio frequency output circuit of the receiver. At the central recording station this audio signal is applied to a signal generator which is adapted to produce a signal of a distinctive frequency modulated or controlled by the received audio signal in such a manner that the local signal is generated only during the non-silent periods of the received audio signal. A plurality of monitoring receivers are also disposed at the central recording station, one for each of the broadcast stations for which data is required. The audio frequency output of each of the monitor receivers is supplied to a local signal generator similar to that actuated by the home receiver, but each generator has a distinctive tone of frequency which is preferably in the audio frequency range although higher frequencies may be employed if desired.

For comparison purposes a time signal is also received at the central station. This may be a radio time signal or a Western Union time signal operating to produce a tone pulse on each hour. The time signal actuates a further signal generator producing its own distinctive tone.

The various tones thus produced are passed through a suitable amplifier and applied to a recording head operating on a suitable recording medium, such as a disc record which is driven at a speed such that the recording period may cover a full day's listening or at least the period of the day during which the data is to be obtained. The record groove thus carries the tones corresponding to the time signal, the various broadcast programs, and a particular home receiver which is to be analyzed. A separate record of this type is made for each of the home receivers and suitably marked for identification so that the records may be grouped as desired for analysis.

The records are analyzed automatically at a master decoding station which may be located at the central recording station above referred to, or may be located at another suitably selected point in which all of the records from the various recording stations are assembled.

At the master decoding station the records are automatically analyzed, the programs to which the listener was tuned at various time periods are determined, and selected counters are actuated which automatically register the total number of receivers tuned to each of the selected programs at each selected time period.

This is accomplished at the master decoding station by playing back each record through a filter circuit having means for separating the various tones which are recorded thereon. Each of the tones is then applied to a pulse former which is adapted to produce a pulse of short duration and given amplitude at the onset of each silent period of the tone being measured. The pulses from the tone representing the home receiver are then compared in separate trigger circuits with the pulses derived from each of the monitors. The trigger circuits operate gate circuits which are arranged to produce pulses of a predetermined duration suited to actuate relays controlling the counters. A pair of gate circuits may be actuated by each of the trigger circuits, one gate circuit producing pulses when there is coincidence between the pulses supplied to the trigger circuits and the other gate circuit producing pulses when there is lack of coincidence in the pulses applied to the trigger circuit. The pulses from each of the first gate circuits constitute stepping pulses which are connected to actuate a stepping relay and the pulses from each of the second gate circuits constitute release pulses which are adapted to return the relay to its initial position. The relay in each channel accordingly advances step-by-step as long as there is coincidence between the initial pulses and is restored to its starting position as soon as any lack of coincidence occurs. After a relay has advanced a predetermined number of steps which are selected to reduce the possibility of spurious operation, a circuit leading through a slow acting relay is closed and will remain closed until the stepping relay is restored to its initial position, that is the circuit to the slow acting relay remains closed as long as there is coincidence between the pulses, indicating that the home receiver is tuned to the designated radio broadcast program.

The relay itself remains closed as long as the home radio is on. When the signal from the home radio is off for 30 seconds or more the slow acting relay breaks the circuit. This is necessary because of the possibility that some home radio might be tuned to a radio station when the station goes off the air. In such a case, the slow acting relay will break the circuit and the counter will stop.

When there is coincidence between the pulses from the home radio and the monitor, the stepping relay will operate one of a bank of counters to indicate that the home radio being analyzed is listening to station A at the time interval represented by the counter. It is to be understood that a set of trigger circuits, gate circuits, stepping relays, timed relays and counters will be provided for each of the stations being monitored.

In order to determine the time distribution of the listening habits, each bank of counters represents one radio station or radio network and contains a number of counters representing the various time periods into which the home radio listening analysis is to be broken down and may, if desired, constitute separate counters for each minute of the day, in which event the counters are connected to a selector switch which is actuated by a time signal to step the switch from one counter to the next one each minute. In this way the number and distribution of the counters actuated indicates the time periods during which the listener was tuned to the respective station.

The above procedure is repeated for each of the records at the master decoding station. When all of a group of records have been played back, the counters then designate the number of home receivers tuned to each of the selected programs during each selected time period. An additional bank of counters may also be provided to be actuated when an audio signal is received on any of the home receivers. This additional bank of counters will thus record the total number of receivers in operation at any particular time.

In order to reduce the time required for analysis the records may be played back at a speed several times their original speed during the recording period, the timing of the various circuits being altered accordingly, or if desired a plurality of the records may be played in overlapping sequence by duplicating for each record in the plurality the equipment up to the bank of counters, in which case it is necessary to displace the records in time so that no two records are connected to the same counter at the same time.

The nature of the invention will be better understood by referring to the following description, taken in connection with the following drawings in which a specific embodiment thereof has been set forth for purposes of illustration.

Figure 1:
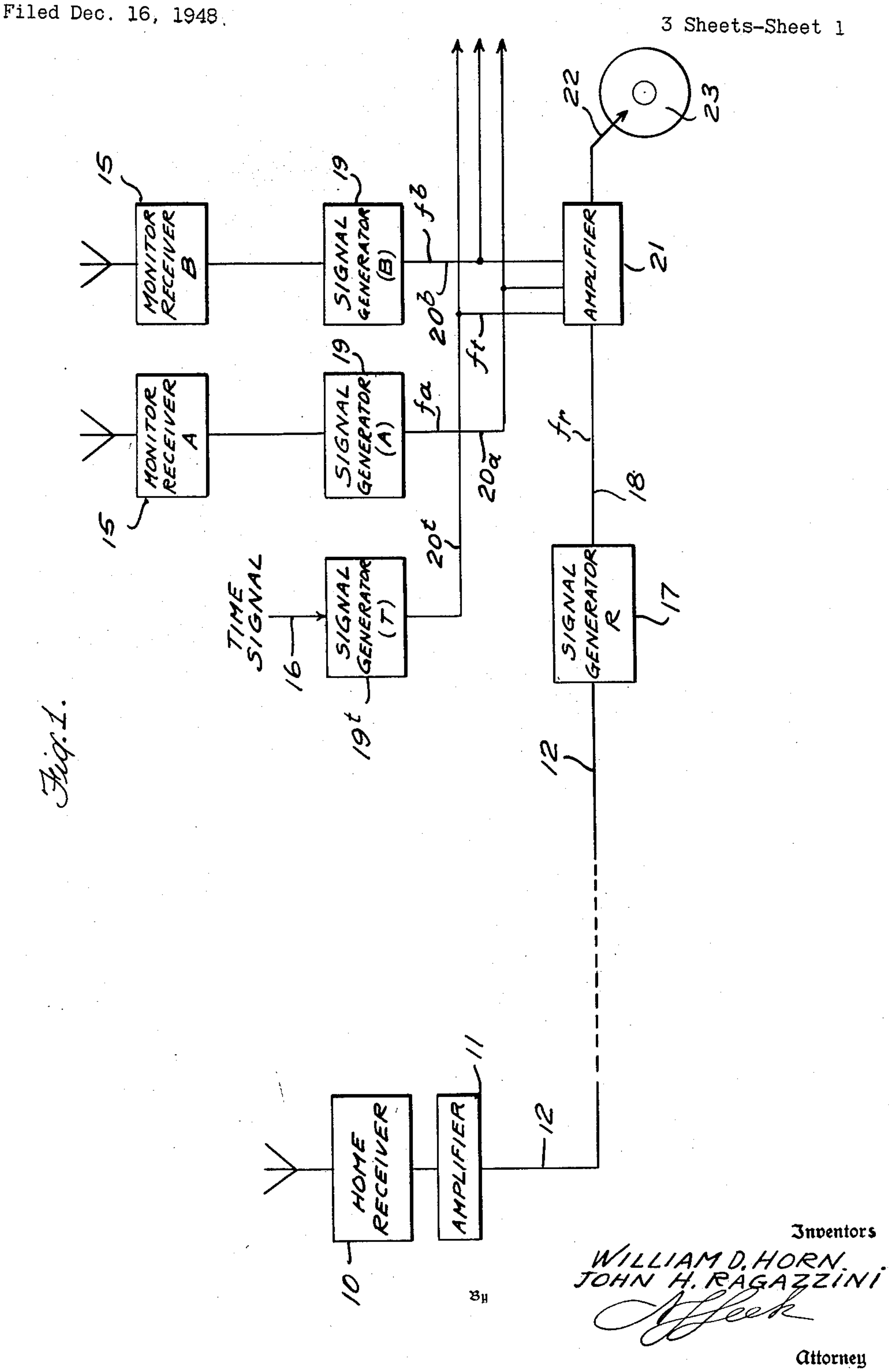
Fig. 1 is a schematic diagram illustrating the system at the home receiver and at the central recording station for recording the various signals.

Referring first to Fig. 1, the system is shown as utilized for analyzing the programs received by a home receiver 10 which is adapted to receive a program of the type being analyzed, for example, a radio broadcast program, television program, facsimile, or the like. The home receiver includes the usual audio circuit which is connected through an amplifier 11 so as to avoid interference with the received program, to a transmission line 12 which may constitute a telephone line, power line, or radio link connecting the home receiver with the central recording station.

The central recording station includes a plurality of monitor receivers 15, two of which are shown for convenience and are assumed to be tuned to broadcast programs A and B which are to be analyzed. It is to be understood that the number of monitors 15 will correspond to the number of programs which are to be received and analyzed simultaneously. A time signal is supplied by a line 16 which may comprise a Western Union signal or a radio time signal.

The line 12 at the central recording station is connected to a control signal generator 17 which is adapted to generate a tone of a frequency $fr$. The signal generator is such that the tone $fr$ is supplied to a line 18 during the non-silent periods of the received program.

The monitor receivers 15 are likewise connected to signal generators 19 each of which is adapted to generate and supply a distinctive tone at frequencies $fa$ and $fb$ to lines 20$a$ and 20$b$ respectively during the non-silent periods of the respective received monitored programs. The time signal from the line 16 is supplied to a similar signal generator 19t which is adapted to produce a distinctive tone of frequency $ft$ and supply the same to a line 20t at intervals corresponding to the time signal or, if the time signal itself constitutes a distinctive tone, the signal generator 19t may be omitted.

The lines 20a, 20b and 20t are supplied to a suitable amplifier 21 where the signals are combined with the signal from the signal generator 17 and are fed to a recording head 22 where they are recorded on a record 23 which has been indicated as a disc record, but may constitute any suitable recording medium and is driven at a speed such that a whole day's program may be recorded on a single record.

It is to be understood that each home receiver 10 will be connected to a separate signal generator and amplifier and its signals will be recorded on a different record. The lines 20a, 20b and 20t may, however, be common to the various amplifiers so that only one set of monitor receivers and signal generators are required. The tone from each generator 19 is of course of a different and distinctive frequency designated as $fa$, $fb$, etc.

It is to be understood that signal generator 17 may be incorporated in the home receiver instead of at the central recording station if desired, in which case the tone $fr$ will be applied to the line 12 at the designated home and will be transmitted by the line 12 to the central recording station. This may be preferable in certain instances, as for example where several receivers are located in the same home, in which case the signal generator may generate a different signal frequency for each of the home receivers and apply the various frequencies to the same line 12. All of the frequencies representing the different receivers may thus be recorded on the same record 23. Similarly, a group of frequencies representing receivers in a selected group of homes may be applied to the same line 12 and may be recorded on the same record 23 thereby eliminating certain duplications of apparatus at the central recording station and also permitting the data from a plurality of receivers to be analyzed at the same time in the master decoding station.

Figure 3:
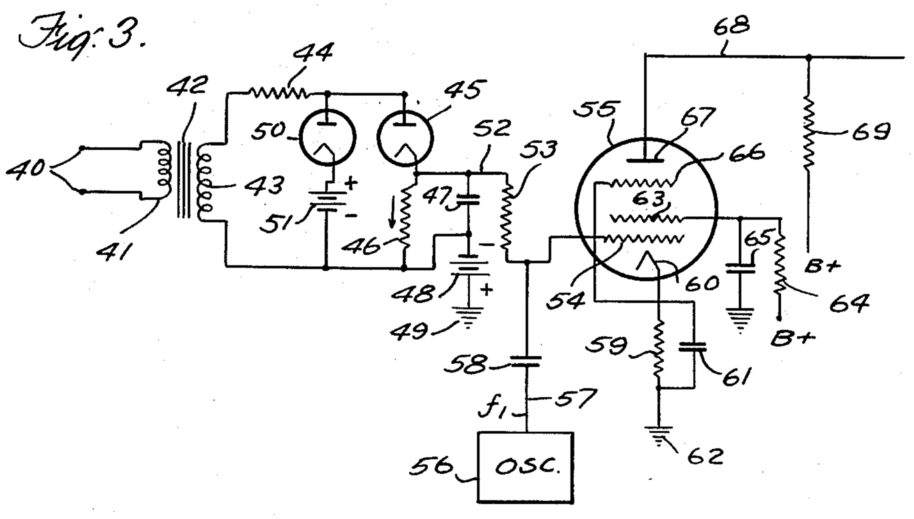
Fig. 3 is a schematic diagram of a signal generator used in the system of Fig. 1.

The signal generator 17, 19 and 19t may be of the type shown in Fig. 3. In Fig. 3 the leads 40 carry a signal which may be the audio signal from any of the receivers 10 or monitors 15 of Fig. 1 to primary 41 of transformer 42 having a secondary 43 connected through a resistor 44 to a rectifier tube 45 and a resistor 46 in series circuit. A condenser 47 is connected across the resistor 46. During periods of audio frequency output from the secondary 43, a rectified current passes through the resistor 46 in the direction of the arrow, producing a voltage drop thereacross. The negative end of the resistor 46 is connected through a biasing battery 48 to ground at 49. The battery 48 is connected to supply a negative bias with respect to ground to the resistor 46. A limiter tube 50 with a biasing battery 51 is connected across the tube 45 and resistor 46 to limit the voltage drop produced across the resistor 46.

The positive end of the resistor 46 is connected by a lead 52 and resistor 53 to the control grid 54 of an amplifier tube 55. The connections are such that with a normal audio frequency output from the secondary 43, the voltage drop across the resistor 46 produces a positive bias with respect to ground which is sufficient to make tube 55 operative. However, during silent periods, the battery 48 supplies a negative bias through the line 52 to the control grid 54 which causes the tube 55 to be cut off. The tube 55 accordingly functions only during the non-silent periods.

The control grid 54 is also supplied with an alternating voltage from an oscillator 56 which is connected through a lead 57 and condenser 58 to the grid 54. The oscillator 56 may be of any standard type adapted to operate continuously to produce a continuous signal of characteristic frequency and to supply the same to the control grid 54. The A. C. signal, however, is amplified by the tube 55 only during the non-silent periods when a positive bias is superimposed on the negative bias supplied to the control grid from the battery 48.

The tube 50 and biasing battery 51 constitute a limiter to prevent the positive bias supplied to the line 52 from becoming excessive. If the battery 51 is of the same potential as the battery 48, then the potential drop across the resistor 46 will combine with the bias across cathode resistor 59, the battery 48, and resistor 46 to cause tube 55 to be in a normal operating condition produced by its own bias resistor 59. In that event the bias on the grid 54 would vary from the negative cut-off value of the battery 48 to normal operating value.

The tube 55 is shown as provided with a cathode 60 which is connected through resistor 59 and condenser 61 to ground at 62, and with a screen grid 63 which is connected through a resistor 64, by-passed by condenser 65, to a source of positive biasing potential. A suppressor grid 66 is connected to the cathode 60. An anode 67 is connected by an output lead 68 and a resistor 69 to a source of positive plate potential.

The arrangement is such that during non-silent periods an A. C. voltage of characteristic frequency, such as $f_a$, $f_b$, $f_r$, or $f_t$, from the oscillator 56 appears in the lead 68, but during silent periods with no audio frequency output from the receivers, the tube 55 is blocked and no signal appears on the lead 68.

It is understood, therefore, that during periods of program silence, no signal will appear on the lead 68. However, during periods of program non-silence, a signal of characteristic frequency $f_a$, $f_b$, or $f_r$ will appear on the line 68 which corresponds to the lines 18, 20a or 20b of Fig. 1. Similarly, during each time signal, a signal of characteristic frequency $f_t$ will appear on the line 68 which corresponds to line 20t of Fig. 1.

Figure 2:
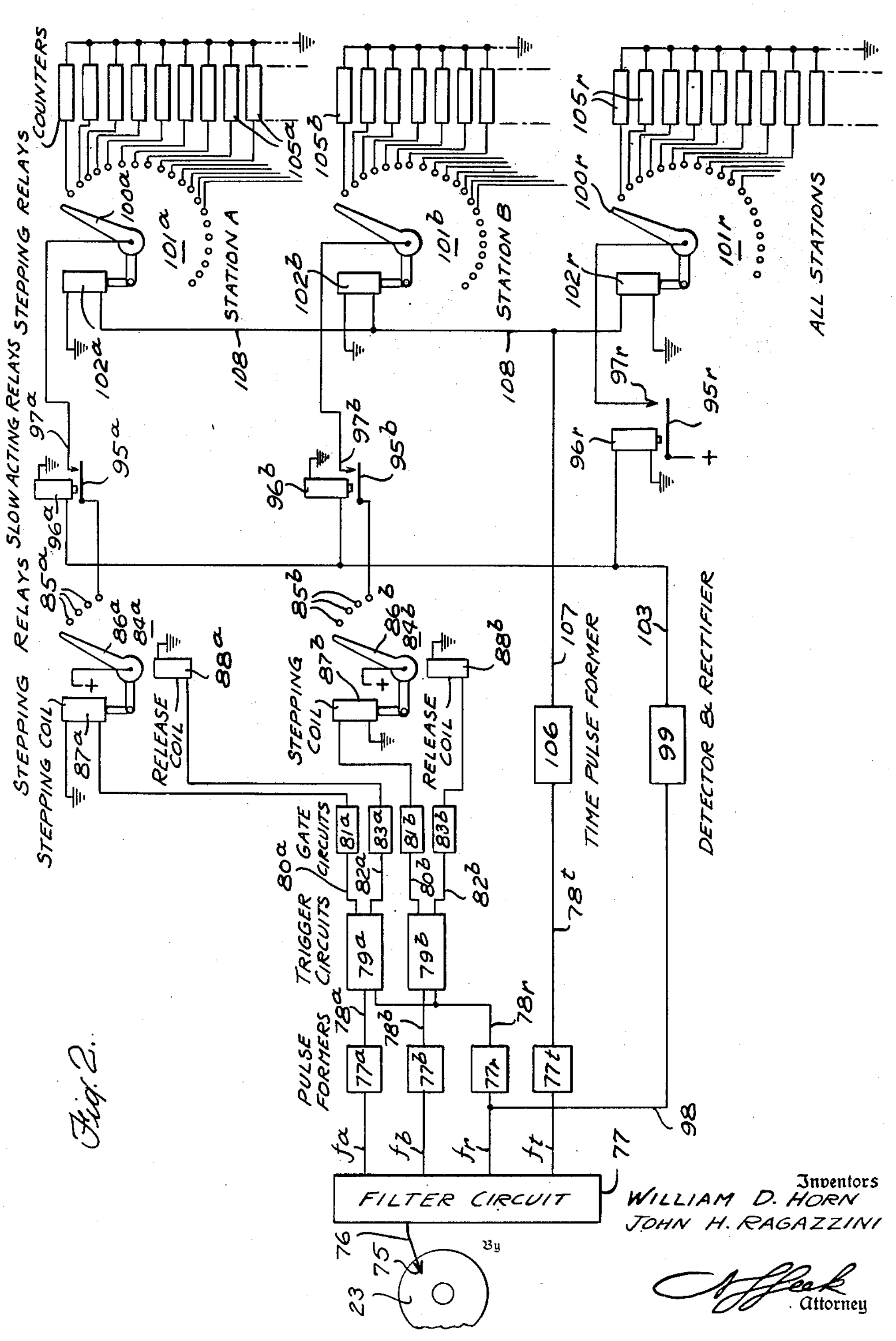
Fig. 2 is a similar schematic block diagram illustrating the equipment at the master decoding station for analyzing the data on the records.
Figures 4, 5, 6:
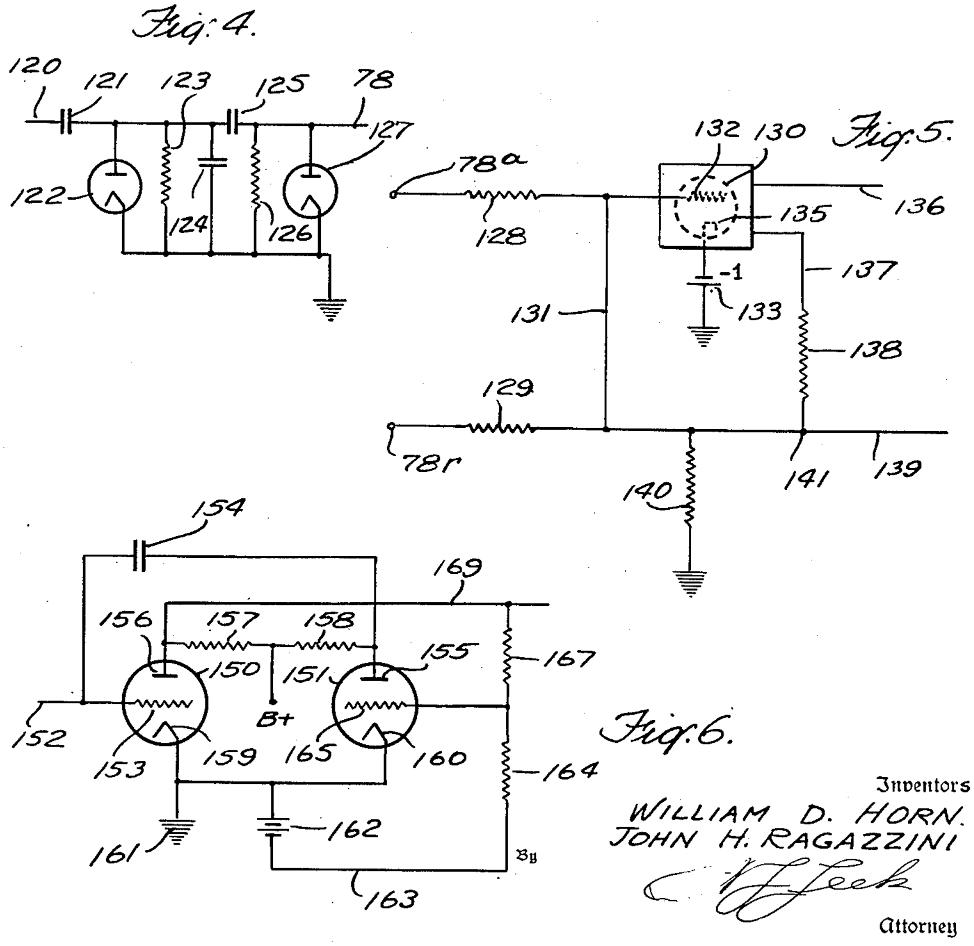
Fig. 4 is a schematic diagram illustrating one type of pulse-forming circuit for use in the system of Fig. 2.
Fig. 5 is a schematic diagram illustrating one type of trigger circuit.
Fig. 6 is a schematic diagram illustrating a type of gate circuit.

Referring now to the master decoding station shown in Fig. 2, the record 23 containing the various tone recordings is driven either at the same speed as in Fig. 1 or at a higher rate of speed and the recordings are picked up from a pick-up head 75 and supplied by a line 76 to a filter circuit 77 which may be of any desired type adapted to separate the different tones and may comprise a set of multi-channel amplifiers each of which may be in the form of a feed-back amplifier which is tuned to a particular characteristic frequency. The tone of frequency $f_a$, $f_b$, $f_r$ and $f_t$ are thus segregated and supplied by suitable leads to pulse formers 77a, 77b, 77r, 77t, respectively. These pulse formers, which may be of the type shown in Fig. 4, are adapted to produce a short, flat topped pulse of constant amplitude at the onset of a silent period in the tone $f_a$, $f_b$, etc. to which the respective pulse formers are responsive.

The pulses from the pulse formers 77a and 77b are supplied by lines 78a and 78b to trigger circuits 79a and 79b respectively. The pulses from the pulse former circuit 77r are supplied by a line 78r to both trigger circuits 79a and 79b. The trigger circuits may be of the type shown in Fig. 5 and are adapted to produce a response in output lines 80a and 80b respectively when the input pulses of the respective line 78a or 78b are coincident with the pulses in the line 78r. These responses are supplied by the lines 80a and 80b to gate circuits 81a and 81b respectively. These gate circuits may be of the type shown in Fig. 6 and are adapted to produce an output pulse of given duration in response to an input signal in the lines 80a or 80b.

The trigger circuits 79a and 79b are also adapted to produce a response in lines 82a and 82b respectively when there is non-coincidence between the pulses supplied to the respective trigger circuits from the line 78r and the line 78a or 78b. These responses in the lines 82a and 82b are supplied by the gate circuits 83a and 83b respectively which may be similar to the gate circuits 81a and 81b above referred to.

The channel corresponding to the station A is provided with a stepping relay 84a. This stepping relay is of any suitable type and is indicated as provided with a plurality of contacts 85a which are successively engaged by arm 86a in response to successive energization of a stepping coil 87a. The relay is of the type in which the arm 86a is automatically restored to its initial position in response to actuation of release coil 88a.

The gate circuit 81a is connected to stepping coil 87a and the gate circuit 83a is connected to release coil 88a so that each pulse from the gate circuit 81a, corresponding to coincidence in the input pulses, results in stepping the relay 84a around one position, and each pulse from the gate circuit 83a, corresponding to non-coincidence, results in restoring the relay to its initial position.

One of the contacts of the stepping relay, shown as the fourth contact, is connected through the armature 95a and contact 97a of a slow acting relay 96a to the arm 100a of a stepping relay 101a which is of a type having a large number of contacts which are closed in succession in response to successive actuations of a stepping coil 102a. The contacts are individually connected to banks of counters 105a.

The frequency $f_t$, corresponding to the time signal, is applied to a pulse former 77t to produce time pulses which are supplied by line 78t to a time pulse former 106 which produces pulses of a short duration at timed intervals. The time pulse former produces pulses which operate the stepping relay 101a. The time pulse former produces, for example, sixty pulses between successive time signals on the record. The time signals on the record may appear once each hour as recorded at the central recording station. Each time signal on a record causes the time pulse former to correct itself if it is not precisely coordinated with the time signal in a manner similar to a standard Western Union electrically-controlled clock. The time pulse former 106 is connected by a line 107 and line 108 to the stepping coil 102a of the stepping relay 101a.

The lead carrying the signal $f_r$ is also connected by a lead 98 to a detector and rectifier 99 which is adapted to supply an output current whenever a signal $f_r$ appears without extended interruptions which would correspond to the home radio being tuned off. This output current is supplied by a line 103 to the coil of the relay 96a and is adapted to hold the contact 97a closed whenever the home radio is tuned to any program, but to open the contact 97a after a predetermined period such as 30 seconds and thereby stop the counters 105a from operating when no program is being received by the home radio. The stepping relays, counters and associated circuits in channel B are supplied in a similar manner from the output of gate circuits 81b and 83b and have been given similar reference characters with the suffix *b*. It is to be understood that similar channels and counters will be provided for each of the programs being analyzed.

The lead 103 is also connected to coil 96r of a slow acting relay having an armature 95r engaging a contact 97r which is connected to the arm 100r of a stepping relay 101r having a group of contacts connected respectively to counters 105r. The stepping relay 101r is provided with a stepping coil 102r which is connected to the line 107.

In the operation of the system shown in Fig. 2, the various tones $f_a$, $f_b$, $f_r$, $f_t$, etc., derived from the record 23, are separated in the filter circuit 77 and individually supplied to pulse former 77a, 77b, 77r and 77t, respectively. Considering the circuit constituting channel A, the pulses from the former 77a and 77r are supplied to the trigger circuit 79a wherein the pulses are compared and when the pulses are coincidental, signals are supplied through the line 80a to the gate circuit 81a which produces a pulse to actuate the stepping coil 87a of the stepping relay 84a. When four successive pulses have been received, the arm 86a will be stepped around to the fourth contact and thereby close the circuit to the stepping relay 101a through slow acting relay 96a. If, however, before four successive coincidental pulses are received a non-coincidence appears between the pulses from the formers 77a and 77r, a signal will be produced by the trigger circuit 79a in the line 82a and supplied to the gate circuit 83a to produce a pulse therein which actuates the release coil 88a and restores the arm 86a to its original position.

In the embodiment shown, the four successive coincidental pulses are required to produce a response in the timed relay in order to avoid the possibility of spurious operations due for example to the accidental coincidence of said pulses when a receiver is tuned to a different station. The likelihood of receiving four successive coincidental pulses without a non-coincidental pulse except when the received and monitored programs match is extremely remote. Of course, more or less than the four steps may be provided in accordance with the accuracy required.

A succession of four coincidental pulses is taken as an indication that the receiver was tuned to the broadcast station A and the coincidental pulses will continue as long as the receiver is tuned to that station. However, after the stepping relay has reached the position four, no further movement thereof will take place and the circuit through slow acting relay 96a will remain closed until a non-coincidental pulse is received which actuates the trigger circuit 83a and produces a pulse to energize the release coil 88a and restore the stepping relay to its initial position. Such a non-coincidental pulse indicates that the receiver was no longer tuned to station A.

When arm 86a of stepping relay 84a reaches the fourth contact, it causes the connected counter 105a to register. The stepping relay 101a is actuated by the stepping coil 102a each time a pulse is received from the time pulse former 106. If the time signals are received once each minute for example the stepping relay 101a will be actuated each minute to connect a different counter 105a into the circuit. With arm 86a on its fourth contact 85a each counter will count once when stepping switch 101a connects it. This count will indicate that one home radio was tuned to station A during the minute which the counter represents.

It is to be understood that the record 23 may be played back at a speed greater than that at which it was recorded, in which event, the switching from one counter to the next will be proportionally faster, but each counter 105a will still represent one minute of listening time. Obviously, this period may be varied as desired and a period of one minute has been selected for reference purposes only.

It is to be understood, of course, that if the code of the frequency $f_r$ derived from the record 23 corresponds to the code of the frequency $f_b$ derived from station B the stepping relay 84b would be actuated instead of the relay 84a and the corresponding counters 105b would be actuated.

As long as a tone of the frequency $f_r$ appears on the record 23, indicating that the receiver is tuned to some program, the detector and rectifier 99 produces pulses to actuate slow acting relay 96r, which is similar to the relay 96a, referred to above, and is adapted to actuate counters 105r. The counters 105r are connected in sequence by stepping relay 101r which is also actuated by a stepping coil 102r in response to the time signal from the line 107. Hence the counters 105r are actuated upon the appearance of a signal of the frequency $f_r$ regardless of the station to which the receiver may have been tuned.

After each record has been played as indicated above, the stepping relays 101a and 101b, 101r, etc. are restored to their initial positions and a second record is analyzed. The second record covering the same radio broadcast day but for a different home radio will then actuate the counters 105a, 105b, 105r in the same timed sequence as the first record. This is repeated until all of the records in a group have been analyzed. The counter 105a will then individually register the total number of receivers which were tuned to station A during the various minutes represented by the individual counters, the counters 105b will show the number of receivers tuned to station B during the various minutes of the day represented by the individual counters, and the counters 105r will represent the total number of receivers in use during the various minutes of the day. By subtracting from the total number of receivers in use the number of sets tuned to station A, station B, and other stations for which there are counters, one may obtain the number of sets tuned to those stations not represented by counters, which may be designated as "all others."

The stepping relays 101a, etc. may be of any standard type, such as that commonly used in telephone circuits, for selecting a large number of circuits and it is to be understood that the representation is only diagrammatic.

If the record 23 carries a plurality of tones representing several different receivers, the circuits designated with the suffix r will be repeated for each tone which is being analyzed and each tone may be analyzed separately by suitable selection in the filter circuit 77, or they may be analyzed simultaneously by duplicating the various analyzing circuits. As pointed out above, a plurality of records may be analyzed simultaneously by duplicating the various circuits shown in Fig. 2 with the exception of the counters and so timing the reproducing of the different records that no two records will be connected to the same counter at the same time. In the embodiment shown, for example, the second record could start one minute after the start of the first record and the third record could start one minute after the start of the second record, and so on. While this would require duplication of apparatus, it would materially reduce the time required to analyze the records.

The pulse formers 77a, 77b, 77r and 77t may be of the type shown in detail in Fig. 4. Referring to this figure more in detail the signal of characteristic frequency is applied from the line 120 through condenser 121 to diode 122. This diode rectifies the signal so that when a non-silent period occurs on the program, a D. C. voltage appears across a resistor 123. A condenser 124 filters out ripple voltages which may interfere with the operation of the remainder of the circuit. The combination of condenser 125 and resistor 126 serves as a differentiating circuit whose output is a negative pulse at the onset of a silent period in the signal on the line 120 and a positive pulse at the termination of a silent period. The positive pulses are short-circuited and thus removed by diode 127. Thus, only negative pulses which mark the onset of a silence appear on output line 78.

The trigger circuit 79 may be of the type shown in Fig. 5. In this figure the line 78a carrying the pulse derived from the pulse former 77a is connected to resistance 128 which is connected to a trigger and limiter 130 which is adapted to produce an output of a predetermined value when rendered operative by a suitable impulse. The pulse from the line 78r is also supplied through resistance 129 and line 131 to the input of the trigger and limiter 130.

The trigger and limiter circuit 130 may include a tube having a grid 132 and cathode 135 which is normally biased to a predetermined point below cut-off by a battery 133 connected to ground.

Assuming the pulses supplied to the lines 78a and 78r to have an amplitude represented by unity, then the tube will be biased beyond cut-off by the battery 133 by an amount represented by −1. In this case it is evident that a pulse of amplitude +1 received from either the line 78a or the line 78r will change the bias from −1 to 0, which is not sufficient to pass the cut-off point; hence no current will be passed by the tube. If the pulses on the lines 78a and 78r are coincidental, however, they will have a total value of +2 which superimposed upon the bias of −1 produced by the battery 133 will produce a positive bias of the value of +1 which will render the tube operative and allow the same to pass a predetermined current. The trigger and limiter circuits are connected to supply a positive pulse to the line 136 and to supply a negative pulse to the line 137. The positive pulse may be of any predetermined value. The negative pulse however is preferably of a value −2 and is supplied through a resistor 138 to a line 139 which is connected to the lead 78r and to ground through a resistor 140.

When no signal appears on either the line 78a or the line 78r no signal will appear on the output line 139. If the pulses appear simultaneously on the lines 78a and 78r and are each of a value of unity, as above assumed, the point 141 receives a pulse of a value of +2 from the combined pulses on the lines 78a and 78r. However, it also receives a pulse of a value of −2 through the line 137 and resistor 138. Hence, a 0 voltage will appear on the output line 139. In the event, however, that a pulse is received on either the line 78a or 78r, but not on both lines, the point 141 will take a value of +1 due to the input pulse, and since there is no output from the trigger circuit 130 at that instant, the line 139 will carry a pulse of a value of +1. Hence a pulse will appear on the line 139 whenever a pulse appears on either the line 78a or the line 78r, but not on both lines. A pulse on the line 139 accordingly represents non-coincidence in the received pulses; whereas a pulse on the line 136 represents a coincidence.

A type of gate circuit for producing the pulses of predetermined duration is shown in Fig. 6. This circuit consists of tubes 150 and 151 connected to transform a short input pulse into a positive output pulse of predetermined duration.

The input lead 152 is connected to the control grid 153 of the tube 150 and through a condenser 154 to the anode 155 of the tube 151. The anodes 156 and 155 are connected through resistors 157 and 158 respectively to a source of positive plate potential. The tubes 150 and 151 are provided with cathodes 159 and 160 respectively which are grounded at 161 and are connected through a biasing battery 162, lead 163 and resistor 164 to the control grid 165 of tube 151. Grid 165 is also connected through a resistor 167 to a lead 169 and to the anode 156 of tube 150.

The tubes 150 and 151 are connected to produce an output pulse in the lead 169, the duration of which is independent of the duration of the input pulse on the lead 152. The tube 150 is normally conducting and the tube 151 is normally non-conducting. Upon the application of a negative pulse to the grid 153, the tube 150 becomes non-conducting and the tube 151 becomes conducting. When the tube 150 becomes non-conducting the potential of the plate 156 rises, due to the removal of the voltage drop through the resistor 157. Hence a positive pulse is applied to lead 169. When the tube 151 becomes conducting, the bias voltage of the tubes are affected so as to cause the tube 150 to again become conducting and the tube 151 to become non-conducting. The period required for this cycle depends upon the circuit constants and is independent of the duration of the negative signal supplied by the input lead 152. Hence a positive D. C. pulse of timed duration is produced in the output lead 169 regardless of the length of the input pulse.

It is to be understood that these circuits are representative only and that the various circuits may be modified as desired. It is also to be understood that in Figs. 1 and 2 the return circuits and sources of potential for operating the various devices have been omitted for purposes of simplification. Various changes and modifications may be made therein as will be readily apparent to a person skilled in the art.

What is claimed is:

1. The method of determining whether a remote radio receiver which is tunable to any one of a plurality of different radio broadcast programs is tuned to a selected one of said programs, which comprises deriving from the remote receiver a time sequence based on the recurrence of periods of predetermined instantaneous signal intensity of the signals of the program being received thereby, monitoring said different programs by individual monitor receivers independently of said remote receiver, simultaneously deriving from the monitor receivers a time sequence based on the recurrence of periods of the same instantaneous signal intensity of the signals being received by the respective monitor receivers, one of which coincides with the first mentioned time sequence, producing a series of audio tones of different frequencies corresponding in number to the remote receiver and to the various monitor receivers, modulating one of said tones to recur in the time sequence derived from said remote receiver, modulating the others of said tones to recur respectively in the time sequences derived from said monitor receivers, and transmitting said audio tones recurring in said times sequences to a common receiving location.

2. A radio listener survey system for determining whether a remote radio receiver which is tunable to any one of a plurality of different radio broadcast programs is tuned to a selected one of said programs, which comprises a signal generator generating a fixed audio tone, means responsive to the output of said remote receiver to derive a time sequence based on the recurrence of periods of a predetermined instantaneous signal intensity of the signals appearing in said output and to actuate said signal generator to produce a distinctive audio tone which recurs in said time sequence, a plurality of monitor receivers tuned respectively to said different radio broadcast programs, a signal generator for each of said monitor receivers, each of said last generators generating a different audio tone, means responsive to the output of each monitor receiver to derive a time sequence based on the recurrence of periods of the same predetermined instantaneous signal intensity of the signals appearing in the outputs of the respective monitor receivers, one of which coincides with the first mentioned time sequence, and to actuate the respective last mentioned signal generators to produce a series of distinctive tones which recur in the respective time sequences derived from said monitor receivers, and means transmitting said recurring audio tones from said generators to a common receiving location.

3. A radio listener survey system for determining whether a remote radio receiver which is tunable to any one of a plurality of different radio broadcast programs is tuned to a selected one of said programs, which comprises a signal generator generating a fixed audio tone, means responsive to the output of said remote receiver to derive a time sequence based on the recurrence of instantaneous non-silent periods in the signals appearing in said output and to actuate said signal generator to produce a distinctive audio tone which recurs in said time sequence, a plurality of monitor receivers tuned respectively to said different radio broadcast programs, a signal generator for each of said monitor receivers, each of said last generators generating a different audio tone, and means responsive to the output of each monitor receiver to derive a time sequence based on the recurrence of instantaneous non-silent periods in the signals appearing in the outputs of the respective monitor receivers, one of which coincides with the first mentioned time sequence, and to actuate the respective last mentioned signal generators to produce a series of distinctive audio tones which recur in the respective time sequences derived from said monitor receivers, and means transmitting said recurring audio tones from said generators to a common receiving location.

4. The method of determining whether a remote radio receiver which is tunable to any one of a plurality of different radio broadcast programs is tuned to a selected one of said programs, which comprises deriving from the remote receiver a time sequence based on the recurrence of periods of predetermined instantaneous signal intensity of the signals of the program being received thereby, monitoring said different programs by individual monitor receivers independently of said remote receiver, simultaneously deriving from the monitor receivers a time sequence based on the recurrence of periods of the same instantaneous signal intensity of the signals being received by the respective monitor receivers, one of which coincides with the first mentioned time sequence, producing a series of audio tones of different frequencies corresponding in number to the remote receiver and to the various monitor receivers, modulating one of said tones to recur in the time sequence derived from said remote receiver, modulating the others of said tones to recur respectively in the time sequences derived from said monitor receivers, and transmitting said audio tones recurring in said time sequences to a common recording medium through which the time sequences of said first mentioned audio tone can be compared with the time sequences of each of said last mentioned audio tones to determine the time coincidence or lack of time coincidence thereof.

5. A radio listener survey system for determining whether a remote radio receiver which is tunable to any one of a plurality of different radio broadcast programs is tuned to a selected one of said programs, which comprises a signal generator generating a fixed audio tone, means responsive to the output of said remote receiver to derive a time sequence based on the recurrence of periods of a predetermined instantaneous signal intensity of the signals appearing in said output and to actuate said signal generator to produce a distinctive audio tone which recurs in said time sequence, a plurality of monitor receivers tuned respectively to said different radio broadcast programs, a signal generator for each of said monitor receivers, each of said last generators generating a different audio tone, means responsive to the output of each monitor receiver to derive a time sequence based on the recurrence of periods of the same predetermined instantaneous signal intensity of the signals appearing in the outputs of the respective monitor receivers, one of which coincides with the first mentioned time sequence, and to actuate the respective last mentioned signal generators to produce a series of distinctive tones which recur in the respective time sequences derived from said monitor receivers, and means transmitting said recurring audio tones from said generators to a common recording medium through which they can be compared.

References Cited in the file of this patent

UNITED STATES PATENTS

| Number | Name | Date |
|---|---|---|
| 1,934,879 | Potter | Nov. 14, 1933 |
| 2,031,605 | Jenkins et al. | Feb. 25, 1936 |
| 2,176,742 | La Pierre | Oct. 17, 1939 |
| 2,188,165 | Thomas | Jan. 23, 1940 |
| 2,206,702 | La Pierre | July 2, 1940 |
| 2,213,886 | Potter | Sept. 3, 1940 |
| 2,354,836 | Rusch | Aug. 1, 1944 |
| 2,413,965 | Goldsmith | Jan. 7, 1947 |
| 2,427,670 | Goldsmith | Sept. 23, 1947 |
| 2,439,201 | Clark, Jr. | Apr. 6, 1948 |
| 2,484,733 | Rahmel et al. | Oct. 11, 1949 |
| 2,484,734 | Rahmel | Oct. 11, 1949 |
| 2,500,935 | Deitz | Mar. 21, 1950 |
| 2,558,754 | Horn et al. | July 3, 1951 |